(12) United States Patent
Semmler et al.

(10) Patent No.: US 12,244,243 B2
(45) Date of Patent: Mar. 4, 2025

(54) POWER CONVERTER ARRANGEMENT WITH SUPPORT STRUCTURE

(71) Applicant: Siemens Energy Global GmbH & Co. KG, Munich (DE)

(72) Inventors: Sebastian Semmler, Nuremberg (DE); Rodrigo Alonso Alvarez Valenzuela, Nuremberg (DE); Andreas Zenkner, Veitsbronn (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 442 days.

(21) Appl. No.: 17/763,309

(22) PCT Filed: Sep. 24, 2019

(86) PCT No.: PCT/EP2019/075656
§ 371 (c)(1),
(2) Date: Mar. 24, 2022

(87) PCT Pub. No.: WO2021/058085
PCT Pub. Date: Apr. 1, 2021

(65) Prior Publication Data
US 2022/0337172 A1     Oct. 20, 2022

(51) Int. Cl.
*H02M 7/483*    (2007.01)
*H02M 1/32*     (2007.01)
*H02M 7/00*     (2006.01)

(52) U.S. Cl.
CPC .............. *H02M 7/483* (2013.01); *H02M 1/32* (2013.01); *H02M 1/325* (2021.05); *H02M 7/003* (2013.01); *H02M 7/4835* (2021.05)

(58) Field of Classification Search
CPC .... H02M 7/483; H02M 7/4835; H02M 7/003; H02M 1/32; H02M 1/325
See application file for complete search history.

(56) References Cited

U.S. PATENT DOCUMENTS

2013/0308235 A1    11/2013 Davies et al.
2016/0241125 A1*   8/2016 Couch ................. H02M 7/4835
(Continued)

FOREIGN PATENT DOCUMENTS

| CN | 106787876 A | 5/2017 |
| CN | 106803724 A | 6/2017 |

(Continued)

*Primary Examiner* — Jue Zhang
(74) *Attorney, Agent, or Firm* — Laurence A. Greenberg; Werner H. Stemer; Ralph E. Locher

(57) ABSTRACT

A power converter arrangement with a modular multi-level converter which includes a series circuit of switch modules which each have a plurality of semiconductor switches and an energy source. Some of the switch modules are of a first type and others of the switch modules are of a second type. During operation, a positive switch module voltage, a negative voltage module voltage, or a null voltage is generated at connection terminals of the switch modules of the first type, and a positive switch module voltage or a null voltage can be generated at connection terminals of the switch modules of the second type. The power converter arrangement further contains a support structure having a number of levels, which each have receptacles in which the switch modules are arranged, with both switch modules of the first and second type being arranged in each level of the support structure.

9 Claims, 1 Drawing Sheet

(56) References Cited

U.S. PATENT DOCUMENTS

| | | |
|---|---|---|
| 2018/0083550 A1 | 3/2018 | Chung et al. |
| 2019/0068076 A1* | 2/2019 | Uda .................... H02M 7/483 |

FOREIGN PATENT DOCUMENTS

| | | |
|---|---|---|
| CN | 107453634 A | 12/2017 |
| CN | 107769598 A | 3/2018 |
| CN | 110112944 A | 8/2019 |
| EP | 2854282 A1 | 4/2015 |
| WO | WO 2012103936 A1 | 8/2012 |
| WO | WO 2019149346 A1 | 8/2019 |

* cited by examiner

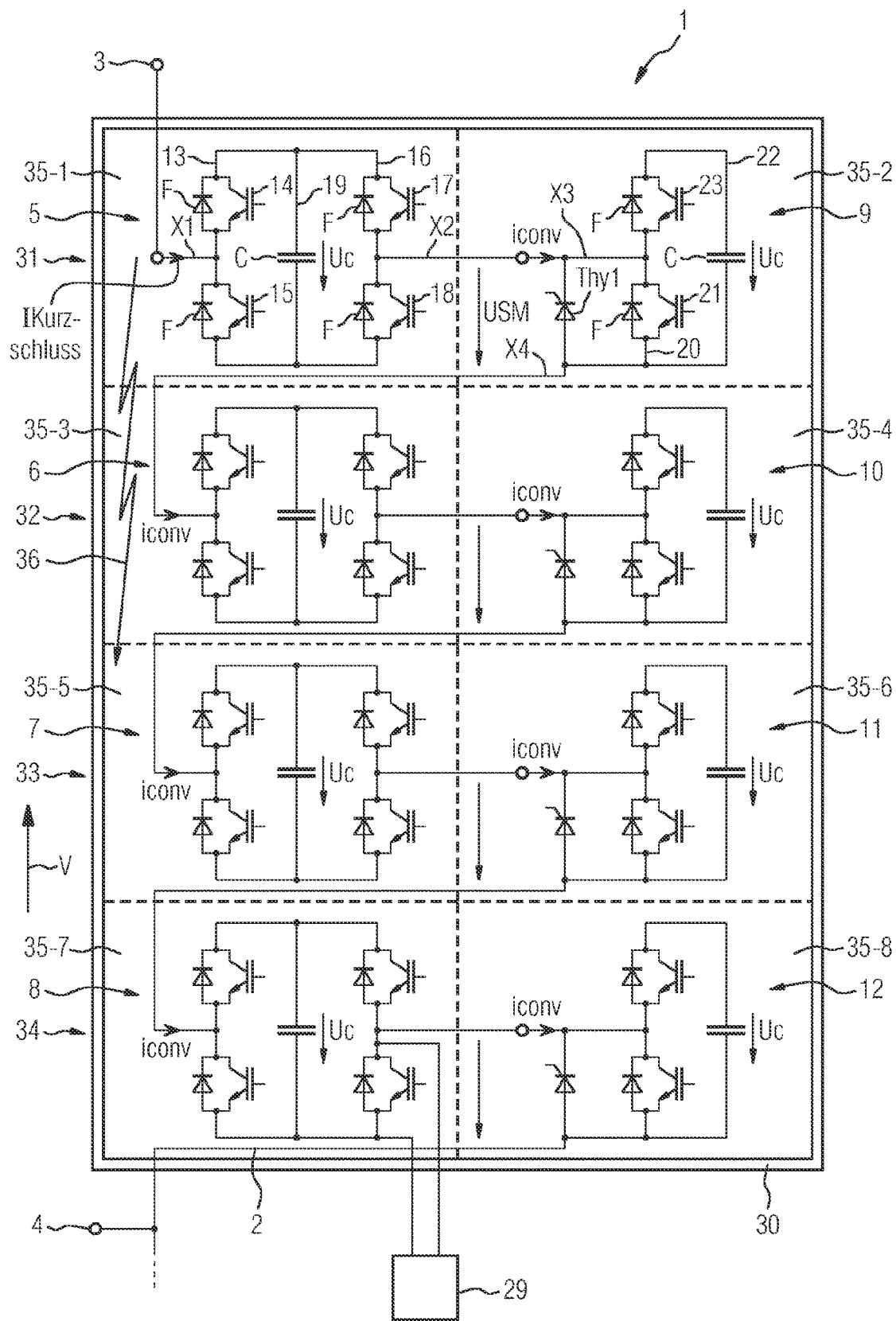

POWER CONVERTER ARRANGEMENT WITH SUPPORT STRUCTURE

FIELD AND BACKGROUND OF THE INVENTION

The invention relates to a power converter arrangement having a modular multilevel power converter (MMC) that comprises a series connection of switching modules that each have a plurality of semiconductor switches and at least one energy storage unit, wherein some of the switching modules are switching modules of a first type and some of the other switching modules are switching modules of a second type, wherein, during operation of the power converter arrangement, in each case a positive switching module voltage, a negative switching module voltage or a zero voltage can be generated at connection terminals of the switching modules of the first type, and in each case a positive switching module voltage or a zero voltage can be generated at connection terminals of the switching modules of the second type.

A power converter arrangement of this kind is disclosed in WO 2012/103936 A1. The MMC of the known power converter arrangement has a three-phase design and accordingly comprises three phase modules that extend between a first and a second DC voltage pole. Each phase module has an AC voltage connection for connecting to a phase line of an AC voltage system, with the result that a power converter arm extends between the AC voltage connection and each of the two DC voltage poles. A series connection of the switching modules is arranged in each of the power converter arms. Each of the series connections comprises switching modules of both types. The advantage of the known power converter arrangement is that an opposing voltage can be built up by means of the switching modules of the first type in the case of a fault, with the result that a fault current can be reduced more rapidly. Using both types of switching modules in turn has the advantage of lower operating and switching losses compared to a power converter having only switching modules of the first type.

SUMMARY OF THE INVENTION

The object of the invention is to further improve the power converter arrangement mentioned at the outset with regard to the fail-safety and reliability thereof.

In the case of a power converter arrangement of the generic type, the object is achieved according to the invention by virtue of the power converter arrangement also comprising a support structure having a plurality of levels that each have receptacles in which the switching modules are arranged, wherein switching modules of both the first and the second type are arranged in each level of the support structure. Arranging the switching modules in the support structure allows the allocation of a defined position for each switching module and fixed predetermined insulation. An arrangement of this kind also simplifies the maintenance of the MMC. Each level of the support structure, which is often in the form of a tower, comprises support apparatuses. The switching modules can, for example, be supported on support apparatuses situated below them or arranged in a suspended manner on support apparatuses situated above them. The number of switching modules in a level, that is to say in an essentially horizontal plane with respect to a vertical of the support structure, can be, for example, between 5 and 50, depending on the application.

On account of the arrangement of the switching modules in the levels of the support structure, a short circuit can arise between a plurality of levels, which is also referred to as a level flashover. The switching modules in the support structure are connected in series with one another, with the result that, if there are a large number of switching modules between the levels, there can be a high potential difference during operation of the power converter arrangement, which can lead to the level flashover. In the event of this fault, a very high current can flow through the switching modules of the levels in question, which can damage the switching modules. The power converter arrangement suitably has a power converter protection means that prompts blocking of the MMC or all of the semiconductor switches of the MMC if a fault of this kind is detected. This disadvantageously interrupts operation thereof, however. On the other hand, the arrangement of the switching modules of both types can advantageously achieve the effect that the very high fault current through the switching modules is prevented or at least reduced. The switching modules of the first type are suitably designed in such a way that the fault current flows through one of the switching modules of the first type via the energy storage unit thereof, specifically such that the polarity of the energy storage unit counteracts the fault current. The energy storage unit voltage of the switching modules of the first type, as the opposing voltage, therefore counteracts the voltage driving the fault current and limits the fault current or short-circuit current. Damage to the switching modules can be advantageously prevented. It becomes less likely that the power converter will be blocked by the power converter protection means, with the result that the reliability and availability of the power converter arrangement is advantageously increased.

In each level, the number of switching modules of the first and the second type is preferably tailored such that a first level voltage can be generated by means of the switching modules of the first type, which first level voltage corresponds to at least one second level voltage that can be generated by means of the switching modules of the second type. The level voltage that can be generated in particular depends on the energy storage unit voltage on the energy storage units of the switching modules. For example, assuming that identical energy storage units are installed in all of the switching modules, the number of switching modules of the first type preferably corresponds to the number of switching modules of the second type. In this way, it is guaranteed that the voltage driving the short circuit can be at least equalized by the opposing voltage built up by means of the switching modules of the first type.

In each level, the switching modules of the first type are preferably arranged alternately with the switching modules of the second type. Therefore, each switching module of the second type adjoins at least one switching module of the first type within the same level. In this way, the likelihood of the switching modules being damaged can be reduced further.

It is considered to be advantageous if the switching modules of the first type are full-bridge switching modules. In a full-bridge switching module, provision is made for a first series connection of turn-off semiconductor switches having the same forward direction, provision is made for a second series connection of turn-off semiconductor switches also having the same forward direction, wherein a dedicated freewheeling diode is connected in antiparallel with each of the semiconductor switches, and provision is made for an energy storage unit that is arranged in an energy storage unit branch connected in parallel with the two series connections of the semiconductor switches. The connection terminals of the full-bridge switching module are each arranged at a potential point between two semiconductor switches of the series connections. The full-bridge switching module advantageously has a relatively simple design and at the same time the required functionality.

The switching modules of the second type are preferably half-bridge switching modules. The half-bridge switching module comprises a first and a second connection and a bridge branch that extends between the connections and in which there is arranged a first turn-off semiconductor switch, with which a freewheeling diode is connected in antiparallel. The switching module also comprises an energy storage unit branch, which extends between the connections and in parallel with the bridge branch, and in which there is arranged a series connection comprising a second turn-off semiconductor switch that is capable of blocking in a unidirectionally controllable manner, and with which a further freewheeling diode is connected in parallel, and an energy storage unit. The half-bridge switching module is characterized by relatively low operating losses.

According to one embodiment of the invention, the power converter arrangement also has a detection device for detecting a level flashover. By means of the detection device, a central power converter controller can receive the information concerning the level flashover and if necessary initiate suitable measures, such as triggering the power converter protection means.

The detection device can expediently monitor a collector-emitter voltage on at least one of the semiconductor switches of the switching modules. A short circuit at the switching module in question can be reliably detected with monitoring of this kind. In particular, a fault case can be reliably determined as detected if the collector-emitter voltage reaches or exceeds a predefined threshold value.

According to one embodiment of the invention, the modular multilevel power converter has a three-phase design and the three phases or phase modules of the modular multilevel power converter are arranged in separate support structures. The insulation gaps between the separate support structures or towers can be chosen to be of an appropriate length. A short circuit between the three phases of the MMC can be advantageously avoided as a result. As described above, the switching modules of both types are in turn suitably arranged in each level within each support structure.

The invention is explained in more detail below with reference to an exemplary embodiment that is illustrated in the FIGURE.

BRIEF DESCRIPTION OF THE FIGURES

The FIGURE shows a schematic illustration of an exemplary embodiment of a power converter arrangement according to the invention.

DETAILED DESCRIPTION OF THE INVENTION

The FIGURE illustrates a section of a power converter arrangement 1 that shows one of six power converter arms of a modular multilevel power converter (MMC). The power converter arm 2 illustrated in the FIGURE extends between a first DC voltage pole 3 and an AC voltage connection 4 of the power converter arrangement 1 or of the MMC.

The power converter arm 2 comprises a series connection of switching modules 5-12. Some of the switching modules 5-12 are switching modules of a first type 5-8, some of the other switching modules are of a second type 9-12. The switching modules of the first type 5-8 are in the form of full-bridge switching modules. The switching modules of the second type 9-12 are in the form of half-bridge switching modules.

The design of the switching modules of the first type 5-8 is described below on the basis of a first switching module 5. The first switching module 5 comprises a first semiconductor branch 13 in which a first series connection of two semiconductor switches 14, 15 in the form of IGBTs (other semiconductor switches such as IGCTs or MOSFETs, for example, are also generally conceivable) is arranged. The first switching module 5 also comprises a second semiconductor branch 16 in which a second series connection of two semiconductor switches 17, 18 in the form of IGBTs is arranged. An energy storage unit branch 19 having an energy storage unit C in the form of a capacitor is arranged in parallel with the two semiconductor branches 13, 16. Two connections X1, X2 of the switching module 5 are arranged between the semiconductor switches 14, 15 or 17, 18 of each of the series connections. A freewheeling diode F is connected in antiparallel with each of the semiconductor switches 14, 15, 17, 18. In the exemplary embodiment illustrated in the FIGURES, all of the switching modules of the first type 5-8 are of the same design, but this does not generally have to be the case.

The design of the switching modules of the second type 9-12 is described below on the basis of a second switching module 9. The half-bridge switching module 9 comprises a first and a second connection X3, X4, and a bridge branch 20 that extends between the connections X3, X4 and in which there is arranged a first turn-off semiconductor switch 21, with which a freewheeling diode F is connected in antiparallel. The second switching module 9 also comprises an energy storage unit branch 22, which extends between the connections X3, X4 and in parallel with the bridge branch 20, and in which there is arranged a series connection comprising a second turn-off semiconductor switch 23, with which a further freewheeling diode F is connected in parallel, and an energy storage unit C in the form of a capacitor. In the exemplary embodiment illustrated in the FIGURES, all of the switching modules of the second type 9-12 are of the same design, but this does not generally have to be the case. In order to protect the half-bridge switching module 9, a circuit breaker Thy1 in the form of a protective thyristor, which can be triggered in the case of a fault, is provided between the connections X3, X4 of the half-bridge switching module.

A detection device 29 is provided to detect a fault in the arrangement by monitoring a collector-emitter voltage on an associated semiconductor switch. The information concerning this is transmitted to a central control device that is not illustrated in the figures. For reasons of clarity, only one detection device has been illustrated in the FIGURES, wherein such a detection device can be provided at each of the semiconductor switches of all of the switching modules 5-12.

The power converter arrangement 1 also comprises a support structure 30 in which the switching modules 5-12 of the power converter arm 2 are arranged. The support structure 30 is supported on the base in the example illustrated and the vertical V thereof is divided into individual levels 31-34. Each level 31-34 in turn has receptacles 35-1 to 35-8 that are configured to receive individual switching modules 5-12.

It should be noted here that the number of levels and the number of receptacles in each level can be adapted in principle as desired and to match the respective application.

The number of two switching modules per level illustrated in the FIGURE serves merely for illustration. It can be seen that both switching modules of the first type (full-bridge switching modules) 5-8 and switching modules of the second type (half-bridge switching modules) 9-12 are accommodated in each level 31-34.

During operation of the power converter arrangement 1, the first DC voltage pole 3 is generally at a different electrical potential than the AC voltage connection 4, with the result that a significant high voltage of several hundred volts can be present between the two potential points. The current direction of the current through the power converter arm 2 is indicated in the FIGURE by means of the arrows iconv. A level flashover can occur on account of the potential difference between the levels 31-34. A short circuit between a first level 31 and a second level 32 of the support structure 30 is indicated in the FIGURE by means of a short-circuit symbol 36. In the case of such a fault, a short-circuit current Ikurzschluss of sometimes more than 10 kA develops, the direction of which can be seen accordingly in the FIGURE. The short-circuit current is driven by the energy storage unit voltage of the half-bridge switching modules. In the half-bridge switching modules 9 and 10, the short-circuit current flows unhindered via the freewheeling diodes in the bridge branch 20. In contrast, in the first switching module 5, the short-circuit current flows via the freewheeling diodes F connected in antiparallel with the semiconductor switches 15 and 17 and via the energy storage unit C of the first switching module 5. On account of the given polarity of the energy storage unit voltage Uc, said voltage constitutes an opposing voltage that opposes the voltage driving the short circuit. The short-circuit current is limited by this opposing voltage and the risk of damage to the switching modules concerned is therefore avoided.

The invention claimed is:

1. A power converter configuration, comprising:
a modular multilevel power converter containing a series connection of switching modules each having a plurality of semiconductor switches, connection terminals, and at least one energy storage unit, wherein some of said switching modules are switching modules of a first type and some others of said switching modules are switching modules of a second type, wherein, during operation of the power converter configuration, in each case a positive switching module voltage, a negative switching module voltage or a zero voltage being generated at said connection terminals of said switching modules of the first type, and in each case a positive switching module voltage or a zero voltage being generated at said connection terminals of said switching modules of the second type; and
a support structure containing a plurality of levels each having receptacles in which said switching modules are disposed, wherein said switching modules of both the first type and the second type are disposed in each of said levels of said support structure.

2. The power converter configuration according to claim 1, wherein, in each of said levels, a number of said switching modules of the first type and the second type is tailored such that a first level voltage is generated by means of said switching modules of the first type, wherein the first level voltage corresponds to at least one second level voltage that is generated by means of said switching modules of the second type.

3. The power converter configuration according to claim 1, wherein in each of said levels, said switching modules of the first type are disposed alternately with said switching modules of the second type.

4. The power converter configuration according to claim 1, wherein said switching modules of the first type are full-bridge switching modules.

5. The power converter configuration according to claim 1, wherein said switching modules of the second type are half-bridge switching modules.

6. The power converter configuration according to claim 1, further comprising a detection device for detecting a level flashover.

7. The power converter configuration according to claim 6, wherein said detection device monitors a collector-emitter voltage on at least one of said semiconductor switches of said switching modules.

8. The power converter configuration according to claim 7, wherein a fault case is detected if the collector-emitter voltage reaches or exceeds a predefined threshold value.

9. The power converter configuration according to claim 1, wherein said modular multilevel power converter has a three-phase configuration and three phases of said modular multilevel power converter are disposed in separate support structures.

* * * * *